United States Patent [19]
Miyake et al.

[11] Patent Number: 5,912,200
[45] Date of Patent: *Jun. 15, 1999

[54] COMPOSITE POWDER AND METHOD OF MANUFACTURING SINTERED BODY THEREFROM

[75] Inventors: Kazumi Miyake; Kagehisa Hamazaki; Hitoshi Toyoda; Yoshikatsu Higuchi, all of Saitama-ken, Japan

[73] Assignee: Honda Giken Kogyo Kabushiki Kaisha, Tokyo, Japan

[*] Notice: This patent is subject to a terminal disclaimer.

[21] Appl. No.: 08/857,463

[22] Filed: May 16, 1997

Related U.S. Application Data

[63] Continuation-in-part of application No. 08/413,445, Mar. 30, 1995, Pat. No. 5,648,028, and a continuation-in-part of application No. 08/625,043, Mar. 29, 1996, Pat. No. 5,767,025.

[30] Foreign Application Priority Data

Mar. 30, 1994 [JP] Japan ..................................... 6-084162
Nov. 29, 1994 [JP] Japan ..................................... 6-319037
Jun. 28, 1996 [JP] Japan ..................................... 8-168092

[51] Int. Cl.⁶ ....................... C04B 35/565; C04B 35/584; B28B 3/00
[52] U.S. Cl. .................... 501/92; 501/97.1; 501/97.2; 501/97.4; 264/122; 264/125; 264/647
[58] Field of Search ........................... 501/92, 97.2, 97.4, 501/97.1; 264/29.7, 122, 125, 647; 428/698

[56] References Cited

U.S. PATENT DOCUMENTS

5,767,025   6/1998   Miyake et al. ............................. 501/92

*Primary Examiner*—Karl Group
*Attorney, Agent, or Firm*—Birch, Stewart, Kolasch & Birch, LLP

[57] ABSTRACT

A composite powder having a specific surface area of 7 m²/g or more is produced by mixing a silicon powder with a carbonaceous powder and a sintering aid powder, and heat-treating the resultant mixed powder in a nitrogen-containing atmosphere at a temperature of 1,450° C. or lower thereby nitriding and carbonizing silicon in the mixed powder. The temperature elevation speed in the heat treatment for nitriding and carbonizing is less than 2° C./minute at least in a range from a temperature at which the nitriding and carbonizing of silicon starts to take place to a temperature at which the composite powder is kept for nitriding and carbonizing of silicon. The composite sintered body is produced by sintering such a composite powder at a temperature of 1,600° C. to 2,200° C.

10 Claims, 3 Drawing Sheets

COMPOSITE POWDER AND METHOD OF MANUFACTURING SINTERED BODY THEREFROM

This application is a continuation-in-part of application Ser. No. 08/413,445 filed on Mar. 30, 1995, now U.S. Pat. No. 5,648,028 and application Ser. No. 08/625,043 filed on Mar. 29, 1996, now U.S. Pat. No. 5,767,025, the entire contents of which are hereby incorporated by reference.

BACKGROUND OF THE INVENTION

The present invention relates to composite powder of silicon nitride and silicon carbide which has a nano-composite structure, and a method of producing a composite sintered body from such a composite powder.

DESCRIPTION OF THE PRIOR ART

Sintered ceramics of silicon nitride are expected to find applications as structural ceramics for use under severe conditions at high temperatures because of their high mechanical strength, heat resistance, thermal shock resistance, wear resistance, etc. While various additives are added to improve the mechanical strength of the sintered ceramics which enables use under severer conditions, silicon carbide is one of the most promising ceramic additives for providing the sintered ceramics with high resistance to oxidation and high mechanical strength at high temperatures.

Therefore, there have been proposed sintered silicon nitride ceramics containing silicon carbide. However, usual sintered ceramics produced from a simple mixture of silicon nitride powder and silicon carbide powder contain silicon carbide particles on the order of microns only in the grain boundaries of silicon nitride particles, failing to have nano-composite structures. Under such circumstances, there have been attempted to provide various processes for producing sintered ceramics having nano-composite structures in which silicon carbide particles are finely dispersed in silicon nitride particles.

Journal of the Ceramic Society of Japan, 101(12), 1993 discloses the production of a composite sintered body of silicon nitride and silicon carbide by mixing a silicon nitride ($Si_3N_4$) powder with a fine silicon carbide (SiC) powder having an average diameter of 0.03 $\mu$m and a specific surface area of 30 $m^2$/g and an yttria ($Y_2O_3$) to form a green body, sintering the green body at 1750–1900° C. in a nitrogen atmosphere at 1 MPa, and further subjecting it to an HIP treatment at 1750° C. and 100 MPa in a nitrogen atmosphere. However, since there is a large difference in particle size between the silicon nitride ($Si_3N_4$) powder and the silicon carbide (SiC) powder, it is impossible to achieve their uniform mixture, likely to provide the resultant sintered body with an uneven structure. With respect to the sintering aid powder, it is also difficult to mix uniformly, resulting in uneven concentration of the sintering aid powder in a green body which in turn leads to insufficient sinterability and poor mechanical strength in the resultant sintered body.

In addition, a CVD method, etc. should be used to obtain as fine a silicon carbide (SiC) powder as 0.03 $\mu$m in average diameter, making its production cost extremely high and thus unsuitable for industrial applications. Further, though the silicon carbide (SiC) powder has a specific surface area as large as 30 $m^2$/g, the specific surface area of the silicon carbide (SiC) powder per se does not contribute to improvement in sinterability of the composite powder, because what affects the sinterability is the specific surface area of the composite powder of silicon nitride and silicon carbide.

Japanese Patent Laid-Open No. 63-30366 discloses a method of producing a sintered body by mixing a silicon metal powder, a silicon carbide powder with a sintering aid powder to form a green body, carrying out a primary sintering step of the green body in a nitriding gas to cause a reaction of the Si metal with $N_2$ to form $Si_3N_4$ which functions to bond SiC particles, and then carrying out a secondary sintering step of the primarily sintered body at a temperature at which the sintering aid works. Because Si metal is used instead of a silicon nitride ($Si_3N_4$) powder as a starting material, shrinkage at the time of sintering is kept small, thereby enhancing a dimensional precision. However, since it is difficult to uniformly nitride the green body from surface to inside, a nitriding reaction does not easily take place deep inside thick green bodies, likely to leave the Si metal unreacted inside the green bodies.

Japanese Patent Publication No. 60-26074 discloses heat-resistant, $\beta$-SiC/$Si_3N_4$ composite ceramics obtained by heat-treating a mixture of an organosilicon polymer and a silicon powder in a non-oxidizing atmosphere ($N_2$) and pulverizing it to form a powder of silicon whose surface is covered with an amorphous material consisting of silicon and carbon, molding the powder into a green body, and sintering the green body in an $N_2$ gas atmosphere. However, like in Japanese Patent Laid-Open No. 63-30366, it is difficult to uniformly nitride the green body from surface to inside. Particularly in the case of thick green bodies, nitriding does not take place easily inside them.

Japanese Patent Laid-Open No. 63-159204 discloses an amorphous, spherical composite powder represented by the general formula: $SiC_xN_yO_z$, wherein X, Y and Z are numbers satisfying 0<X<1.5, 0<Y<2.0 and 0<Z<0.2, and having an average diameter of 1 $\mu$m or less, the composite powder being formed by a vapor reaction (CVD) of an organosilicon polymer, ammonia and/or an inorganic gas. This amorphous composite powder is subjected to a heat treatment in a non-oxidizing atmosphere to remove decomposed components to prevent the generation of gas during sintering which causes the formation of pores. However, the amorphous composite powder obtained by the method of this reference is so bulky that it cannot easily be formed into a high-density green body, whereby the resultant green body is not easily turned into a dense sintered body without using a hot-pressing method. Therefore, the sintered products are limited to those having relatively simple shapes.

Japanese Patent Publication Nos. 4-54609 and 4-54610 disclose a 100%-crystalline, composite powder of silicon nitride and silicon carbide obtained by heat-treating the above amorphous fine composite powder at 1400–1600° C. to overcome the disadvantages of the above amorphous composite powders. However, sintered bodies obtained from this 100%-crystalline, composite powder of silicon nitride and silicon carbide by hot-pressing or HIP have mechanical properties poorer than those obtained from the above amorphous composite powder. Further, the 100%-crystalline, composite powder cannot easily be turned into dense sintered bodies by normal pressure sintering or gas-pressure sintering.

Japanese Patent Laid-Open Nos. 6-287007 and 6-287008 disclose a partially crystalline composite powder of silicon nitride and silicon carbide having a specific surface area of preferably 10–25 $m^2$/g and a density of 1.3 $g/cm^3$, which is mixed with a sintering aid powder and molded, heated at 1400–1600° C. for 0.5–24 hours and then subjected to a liquid sintering at 1600–2300° C. However, the composite powder of these references is identical to a mixture of the crystalline composite powder of Japanese Patent Laid-Open No. 63-159204 with the amorphous composite powder of Japanese Patent Publication Nos. 4-54609 and 4-54610 at a ratio (weight %) of 10/90–80/20. Accordingly, the partially crystalline composite powder suffers from the generation of pores and the deterioration of mechanical properties by decomposition of amorphous components. In addition, it cannot be turned into dense sintered bodies by normal pressure sintering or gas-pressure sintering. Also, since a sintering aid powder is mixed with the partially crystalline composite powder and then sintered, the dispersion of the sintering aid powder is uneven, causing poor sinterability and segregation of the sintering aid, which leads to sintered bodies with poor properties. Further, these references fail to teach the specific surface area of the composite powder.

Apart from the above references, there is Japanese Patent Laid-Open No. 2-160669 disclosing a composite sintered body of silicon nitride and silicon carbide having a microstructure wherein silicon carbide particles having an average diameter of 1 $\mu$m or less are dispersed in the grain boundaries, and finer silicon carbide particles having sizes ranging from several nanometers to several hundred nanometers are dispersed in silicon nitride particles. This composite sintered body is produced from a composite powder of amorphous silicon nitride and silicon carbide or a mixed powder of silicon nitride and silicon carbide by a liquid-phase sintering at a temperature ranging from 1,500° C. to 2,300° C. in the presence of a sintering aid powder. In the liquid phase sintering process, fine silicon nitride particles having an average diameter of 0.5 $\mu$m or less are produced. However, the composite powder of amorphous silicon nitride and silicon carbide, which is produced by a vapor phase reaction of an organic silicon compound, is extremely expensive and not suitable for mass-production. Another problem is that the amorphous powder has poor moldability. Also, what is specifically disclosed thereby as a mixed powder of silicon nitride and silicon carbide is a mixture of amorphous silicon nitride powder produced by a similar process to the above and silicon carbide powder, and such mixture suffers from similar disadvantages.

Japanese Patent Laid-Open No. 3-261611 discloses a process of manufacturing a composite powder for the manufacture of a composite sintered body of silicon nitride and silicon carbide, which comprises the steps of mixing silicon metal powder and carbonaceous powder together, heating the resultant mixture in an inert gas atmosphere such as nitrogen at a temperature of 1,400° C. or lower, thereby simultaneously effecting carbonizing and nitriding reactions of the silicon metal powder. However, since the composite powder contains no sintering aid powder, β-silicon nitride tends to be formed by this heat treatment, making it difficult to increase the percentage of α-silicon nitride in the composite powder. Since β-silicon nitride tends to grow in a needle shape, the resultant powder is likely to have a large diameter and therefore cannot easily be pulverized.

OBJECT AND SUMMARY OF THE INVENTION

It is therefore an object of the present invention to provide a composite powder of silicon nitride and silicon carbide with good sinterability suitable for the manufacture of a composite sintered body with excellent mechanical strength, etc.

Another object of the present invention is to provide a method of manufacturing such composite powder of silicon nitride and silicon carbide.

A further object of the present invention is to provide a method of manufacturing a composite sintered body of silicon nitride and silicon carbide having excellent mechanical strength, etc.

According to one embodiment of the present invention, there is provided a composite powder of silicon nitride and silicon carbide produced by mixing a silicon powder with a carbonaceous powder and a sintering aid powder, and heat-treating the resultant mixture in a nitrogen-containing atmosphere to nitride and carbonize silicon in the mixed powder.

According to another embodiment of the present invention, there is provided a composite powder of silicon nitride and silicon carbide produced by mixing a silicon powder with a carbonaceous powder and a sintering aid powder, and heat-treating the resultant mixture in a nitrogen-containing atmosphere to nitride and carbonize silicon in the mixture, the composite powder being crystalline and having a specific surface area of 7 $m^2/g$ or more.

According to a further embodiment of the present invention, there is provided a method of manufacturing a composite powder of silicon nitride and silicon carbide comprising the steps of (a) mixing a silicon powder, a carbonaceous powder and a sintering aid powder, and (b) heat-treating the resultant mixed powder in a nitrogen-containing atmosphere at a temperature of 1,450° C. or lower thereby nitriding and carbonizing silicon in the mixed powder, a temperature elevation speed being less than 2° C./minute at least in a range from a temperature at which the nitriding and carbonizing of silicon starts to take place to a temperature at which the composite powder is kept for nitriding and carbonizing of silicon.

According to a still further embodiment of the present invention, there is provided a method of manufacturing a composite sintered body of silicon nitride and silicon carbide comprising the steps of (a) forming a green body from the above composite powder, (b) sintering the green body at a temperature of 1,600° C. to 2,200° C. in a nitrogen-containing atmosphere.

The above objects, features and advantages of the present invention will become apparent from the following descriptions.

DETAILED DESCRIPTION OF THE PREFERRED EMBODIMENTS

[1] Composite powder (1) Starting materials (a) Silicon powder

A silicon powder used in the present invention has an average diameter ranging preferably from 0.2 $\mu$m to 20 $\mu$m, more preferably from 0.3 μm to 10 μm. If the average diameter is less than 0.2 μm, the surfaces of the Si particles would be oxidized excessively. On the other hand, if the average diameter is greater than 20 μm, it would be difficult to disperse the silicon powder uniformly, and the silicon powder would be poor in reactivity.

The silicon powder usable in the present invention may be of wide varieties of grades, for instance, from relatively inexpensive, low-purity silicon powder defined by JIS G2313 to expensive, high-purity silicon powder obtained by pulverizing semiconductor wafer wastes, etc. In the case of the high-purity silicon powder, Fe, Cr, Co or their compounds may be added to accelerate a nitriding and carbonizing reaction.

The content of the silicon powder in the starting materials ranges preferably from 81.2% to 97.6% by weight, more preferably from 84.2% to 93.2% by weight, based on the total weight (100% by weight) of silicon powder and carbonaceous powder. If the content of the silicon powder is less than 81.2% by weight, the resulting sintered body would not be provided with high density. On the other hand, if the content of the silicon powder is greater than 97.6% by weight, sufficient effects of combining with silicon carbide would not be achieved.

(b) Carbonaceous powder

A carbonaceous powder used in the present invention is not limited to any particular type insofar as it is fine powder. However, the carbonaceous powder is preferably a graphite powder or a carbon black powder such as acetylene black, ketchen black, etc. The carbonaceous powder has an average diameter of preferably 20 μm or less and more preferably 10 μm or less. If the average diameter of the carbonaceous powder is greater than 20 μm, the carbonaceous powder would not be uniformly dispersed.

The content of the carbonaceous powder in the starting materials ranges preferably from 2.4% to 18.8% by weight, more preferably from 6.8% to 15.8% by weight. If the content of the carbonaceous powder is less than 2.4% by weight, sufficient effects of adding carbonaceous powder would not be achieved. On the other hand, if the content of the carbonaceous powder is greater than 18.8% by weight, the density of the resulting sintered body would not be high enough.

(c) Silicon nitride ($Si_3N_4$) powder

In order to improve the moldability of a silicon powder mixture, a silicon nitride ($Si_3N_4$) powder having an average diameter ranging preferably from 0.1 μm to 5 μm, more preferably from 0.1 μm to 3 μm, may be added as a seed for forming silicon nitride. The amount of the silicon nitride powder added ranges preferably from 0% to 10% by weight, more preferably from 0% to 5% by weight based on the total weight (100% by weight) of silicon nitride formed by the heat treatment and silicon nitride added. If too much silicon nitride powder is added to the silicon powder (a ratio of the silicon nitride powder to the silicon powder is too high), silicon would not be sufficiently reaction-sintered.

(d) Silicon carbide powder

In order to improve the moldability of a silicon powder mixture, a silicon carbide (SiC) powder having an average diameter ranging preferably from 0.1 μm to 5 μm, more preferably from 0.3 μm to 3 μm, may be added as a seed for forming silicon carbide. The amount of the silicon carbide powder added ranges preferably from 0% to 10% by weight, more preferably from 0% to 5% by weight based on the total weight (100% by weight) of the silicon carbide formed by the heat treatment and silicon carbide added. If the amount of the silicon carbide powder added is greater than 10% by weight, silicon would not sufficiently be reaction-sintered.

(e) Sintering aid powder

Preferably added to the starting materials is a sintering aid powder which may be at least one oxide of elements in Groups 3A and 4A of the Periodic Table, or a combination of at least one oxide and aluminum nitride or aluminum oxide. Specifically, the sintering aid powder may be at least one oxide selected from the group consisting of $Y_2O_3$, $Al_2O_3$, $SiO_2$, MgO, $Yb_2O_3$, $HfO_2$, $La_2O_3$, $Fe_2O_3$, $Lu_2O_3$, $ZrO_2$, etc., or a combination of such an oxide and AlN. Particularly preferable sintering aid is $Y_2O_3$ alone or a combination of $Y_2O_3$ and $Al_2O_3$ or AlN.

The content of the sintering aid powder added ranges preferably from 5% to 20% by weight, more preferably from 7% to 15% by weight, based on the total weight (100% by weight) of the composite powder formed by the heat treatment. If the content of the sintering aid powder is less than 5% by weight, the sinterability of the resulting composite powder would be insufficient. On the other hand, if the content of the sintering aid powder is greater than 20% by weight, the resulting sintered body would be poor in high-temperature strength.

The sintering aid powder is mixed with the silicon powder and the carbonaceous powder and subjected to a nitriding and carbonizing reaction. By adding the sintering aid powder from the beginning, the percentage of α-silicon nitride in the composite powder increases, and the sintering aid powder is dispersed well, thereby increasing the mechanical strength of the sintered body.

(2) Production of composite powder (a) Mixing

The above starting materials are sufficiently mixed by a ball mill, a kneader, etc. in a dry or wet mixing process. In the case of a wet mixing process, a dispersing medium such as ethanol, butanol, etc. is added to the powders suitably together with an organic or inorganic binder. Suitable organic binders are, for example, ethyl silicate, polyethylene glycol, polyvinyl alcohol (PVA), an acrylic emulsion, a polyurethane emulsion, etc. An inorganic binder may also be added.

(b) Nitriding/carbonization

The mixed powder is heated in a nitrogen-containing atmosphere to nitride and carbonize the silicon powder therein. The nitriding and carbonizing rates are determined depending on the amount of carbon added to the starting materials. Since substantially all carbon is bonded to silicon to form silicon carbide, unreacted silicon is transformed substantially entirely into silicon nitride. If silicon and carbon are mixed at a molar ratio of 100/7, for instance, the molar ratio of silicon nitride and silicon carbide formed by the nitriding and carbonizing reaction will be 31/7.

Though conditions for nitriding and carbonizing the silicon powder in the mixed powder are changeable depending on the composition of the mixed powder, etc., the mixed powder is generally heated to a temperature of 1,450° C. or lower. If the mixed powder is heated to a temperature exceeding 1,450° C., silicon would be dissolved away or evaporated. The lower limit of the nitriding and carbonizing temperature is preferably 1,000° C. If the lower limit of the nitriding and carbonizing temperature is lower than 1,000° C., nitriding and carbonizing reactions, if any, would be too slow. Thus, the nitriding and carbonizing temperature is preferably from 1,000° C. to 1,450° C. The more preferable nitriding and carbonizing temperature is from 1,100° C. to 1,400° C., particularly 1100–1380° C.

The temperature elevation speed should be sufficiently low until reaching the nitriding and carbonizing temperature which is kept constant. Specifically it should be less than 2°

C./minute near a temperature range of 900–1,300° C. The preferred temperature elevation speed is 0.5° C./minute or less. If the temperature elevation speed is 2° C./minute or more, too vigorous nitriding reaction would take place, thereby lowering the percentage of α-silicon nitride in the resulting composite powder and deteriorating the sinterability of the composite powder. The percentage of α-silicon nitride is preferably 30% or more, more preferably 40% or more, based on all silicon nitride in the resultant composite powder. By increasing the percentage of α-silicon nitride, good sinterability can be achieved even by a composite powder with a relatively small specific surface area.

The pressure of the nitrogen-containing atmosphere is preferably 1 kgf/cm$^2$ or more, more preferably from 5 kgf/cm$^2$ to 2,000 kgf/cm$^2$. If the pressure of the nitrogen-containing atmosphere is lower than 1 kgf/cm$^2$, nitriding would not sufficiently occur. The nitriding and carbonizing reaction is preferably carried out for 1–10 hours.

The term "nitrogen-containing atmosphere" used throughout the specification means a nitrogen gas or a gas containing a nitrogen gas such as a mixture of a nitrogen gas and a hydrogen gas, a mixture of a nitrogen gas and an ammonia gas, etc.

When the nitriding process is carried out under the above conditions, the silicon particles in the mixed powder are converted not only to silicon nitride particles containing a high proportion of α-silicon nitride by nitriding but also to finer silicon carbide particles by carbonizing, and the resultant silicon nitride particles and silicon carbide particles are finer than the starting silicon powder and carbonaceous powder. Since SiC is formed by the reaction of Si and C, SiC is distributed not only in boundaries of $Si_3N_4$ particles but also in $Si_3N_4$ particles.

(c) Pulverization

The heat-treated mixture of silicon nitride, silicon carbide and a sintering aid is pulverized to fine composite powder by a ball mill, a jet mill, an attrition mill, etc. The composite powder thus produced has an average diameter ranging from 0.1 μm to 5 μm, preferably from 0.3 μm to 3 μm.

(3) Properties of composite powder

The pulverized composite powder has a specific surface area of preferably 7–40 m$^2$/g, more preferably 9–40 m$^2$/g measured according to a BET method. When the specific surface area of the composite powder is 7 m$^2$/g or more, the composite powder shows satisfactory sinterability, so that it is possible to obtain a dense sintered body even at an atmospheric pressure less than 10 kgf/cm$^2$. When the atmospheric pressure is less than 10 kgf/cm$^2$ at the time of sintering, a high-pressure generator is not needed, making the production cost of the sintered bodies low.

When the specific surface area of the composite powder is less than 7 m$^2$/g, the composite powder shows poor sinterability. On the other hand, when it is more than 40 m$^2$/g, surfaces of the composite powder is likely to be oxidized.

[2] Composite sintered body (1) Production of a composite sintered body

The above composite powder is molded to a desired shape by die-pressing, slip casting, injection molding, etc. The die-pressing is carried out by a proper pressing die after removing a dispersion medium. The slip casting is carried out by casting a slurry of the mixed powder in a dispersion medium into a water-absorbing die. The injection molding is carried out by injecting the mixed powder with a proper organic or inorganic binder as described above. If the composite powder is molded to a complex shape, a slip casting method and an injection-molding method are preferable.

The resultant green body is sintered in a nitrogen-containing atmosphere at a temperature ranging from 1,600° C. to 2,200° C., preferably from 1,800° C. to 2,000° C. If the sintering temperature is lower than 1,600° C., the mechanical strength and toughness of the resulting sintered body would be low. If the sintering temperature is higher than 2,200° C., the silicon nitride would undesirably be decomposed.

The green body is sintered in a non-oxidizing atmosphere, preferably in a nitrogen gas atmosphere preferably at 5–2,000 kgf/cm$^2$. The sintering temperature of the green body is preferably maintained for about 1–5 hours. To achieve a high sintering density, the green body is preferably sintered by a hot isostatic pressing (HIP) method or a hot pressing (HP) method. Particularly in the case of HIP, a sintered body of a complicated shape can be produced.

(2) Structure of composite sintered body

A composite sintered body of silicon nitride and silicon carbide thus produced has a so-called nano-composite structure wherein fine silicon carbide particles are uniformly dispersed in silicon nitride particles. Since the silicon carbide particles have a larger coefficient of thermal expansion than the silicon nitride particles, it is considered that residual stress is exerted onto the silicon nitride particles. The fine silicon carbide particles dispersed in the silicon nitride particles appear to act as wedges to inhibit grain boundaries from slipping of silicon nitride, thereby providing the sintered body with improved high-temperature strength and creep resistance.

Therefore, if the ratio of silicon carbide to silicon nitride is too small, sufficient effects would not be obtained. If the ratio of silicon carbide to silicon nitride is too large, too many silicon carbide particles would be dispersed, suppressing the grain growth of silicon nitride and hence preventing the density of the sintered body from sufficiently increasing. For these reasons, the weight ratio of silicon carbide to silicon nitride ranges preferably from 5/95 to 50/50, and more preferably from 15/85 to 40/60.

The present invention will be described in greater detail below with reference to Examples and Comparative Examples without intention of limiting the scope of the present invention defined by the claims attached hereto.

EXAMPLE 1

71.7% by weight of a silicon powder having an average diameter of 0.5 μm, 11.9% by weight of a carbon black powder having an average diameter of 0.2 μm, 3.9% by weight of a silicon nitride powder having an average diameter of 0.1 μm, 2.1% by weight of a silicon carbide powder having an average diameter of 0.2 μm, and 10.4% by weight of an yttrium oxide powder having an average diameter of 1.4 μm were weighed such that they had a total weight of 300 g after 100% completion of reaction, mixed for 18 hours by a ball mill with ethanol as a solvent, and then dried.

Figure 1:
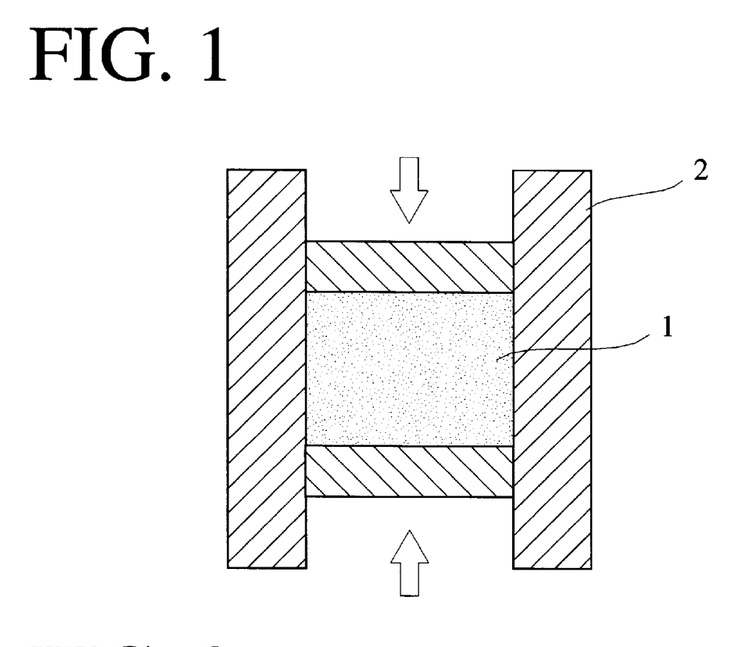
FIG. 1 is a schematic cross-sectional view of a hot-pressing graphite die for producing a composite sintered body.
Figure 2:
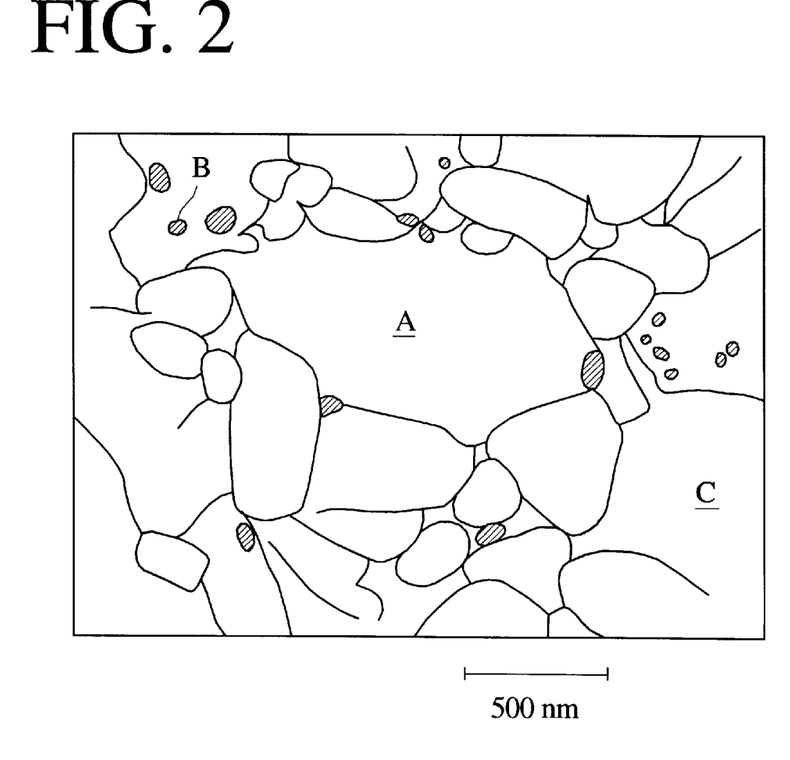
FIG. 2 is a schematic diagram showing a microstructure of a composite sintered body produced in Example 1.

As shown in FIG. 1, the mixed powder 1 thus obtained was introduced into a hot-pressing graphite die 2 having a diameter of 50 mm, and kept at a temperature of 1,400° C. for 4 hours in a nitrogen gas atmosphere under 9 kgf/cm$^2$ to cause nitriding and carbonizing reactions. The temperature was then elevated to a maximum level of 1,800° C. under a load to 5 tons in a nitrogen gas atmosphere to sinter the mixed powder for 4 hours by hot pressing, thereby obtaining a sintered body. A microscopic observation indicated that the sintered body had a nano-composite structure as schematically shown in FIG. 2 in which "A" represents silicon nitride particles, "B" silicon carbide particles, and "C" a phase composed of silicon, yttrium and oxygen. After measurement of a density by an Archimedean method, the resultant sintered body was measured with respect to a silicon carbide content and hardness. The results are as follows:

Sintered body density: 3.3 g/cm$^3$.

Silicon carbide content*: 35% by weight.

*: Calculated from the quantitative analysis data of Si, C and N in the sintered body by the following equation:

[SiC/(SiC+Si$_3$N$_4$)]×100%.

Hardness (Hv)**: 2,197 kgf/mm$^2$.

**: After polishing a surface of the sintered body sample by a diamond grinder, the hardness of the sample was measured by a Vickers hardness test machine under the conditions of 500 g for 10 seconds.

The sintered body was cut to test pieces each having a size of 3 mm×4 mm×40 mm, and each test piece was subjected to a three-point bending test at a room temperature and at 1,400° C. and a static fatigue test under the following conditions:

(1) Three-point bending test (i) At room temperature: The test was conducted with a span of 30 mm at a crosshead speed of 0.5 mm/minute.

(ii) At 1,400° C.: After heating the test piece at 1,400° C. for 1 hour, the test was carried out under the same conditions as in (1) (i) above.

(2) Static fatigue test

The test piece was placed on a three-point bending jig with a span of 30 mm and heated at 1,300° C. for 1 hour. Thereafter, a predetermined load was applied to the test piece to measure the elapsed time until the test piece was broken, to determine the static fatigue.

The results of the three-point bending test and the static fatigue test are shown in Table 1 below.

TABLE 1

Three-point bending strength:
  580 MPa at room temperature, and
  591 MPa at 1,400° C.
Static fatigue test (1300° C., after 10,000 hours)
  353 MPa.

EXAMPLES 2, 3 AND COMPARATIVE EXAMPLE 1

A silicon powder having an average diameter of 0.5 μm, a carbon black powder having an average diameter of 0.2 μm, a silicon nitride powder having an average diameter of 0.1 μm, a silicon carbide powder having an average diameter of 0.2 μm, an yttrium oxide powder having an average diameter of 1.4 μm, and an aluminum nitride powder having an average diameter of 2 μm were weighed at proportions shown in Table 2 such that they had a total weight of 300 g after 100% completion of reaction, mixed for 18 hours by a ball mill with ethanol as a solvent and then dried. The mixed powder thus obtained was sintered by hot pressing under the same conditions as in Example 1, and the resultant sintered body was measured with respect to properties. The results are shown in Table 2.

TABLE 2

|  | Example 2 | Example 3 | Com. Ex. 1 |
|---|---|---|---|
| Powder Composition (wt. %) |  |  |  |
| Si Powder | 72.9 | 69.9 | 80.6 |
| Carbon Black Powder | 10.4 | 11.3 | — |
| Si$_3$N$_4$ Powder | 4.3 | 3.9 | 7.1 |
| SiC Powder | 1.8 | 2.0 | — |
| Y$_2$O$_3$ Powder | 10.6 | 9.0 | 12.3 |
| AlN Powder | — | 3.9 | — |
| Properties of Sintered Body |  |  |  |
| Density (g/cm$^3$) | 3.2 | 3.2 | 3.0 |
| SiC Content (wt. %)$^{(1)}$ | 30 | 34 | 0 |
| Hardness (Hv)$^{(2)}$ | 2,012 | — | 1,062 |
| Three-point bending strength (MPa) |  |  |  |
| at Room Temp. | 570 | 328 | — |
| at 1,400° C. | 584 | 252 | —* |
| Predicted Strength$^{(3)}$ | 348 | 177 | — |

Note:
$^{(1)}$Calculated in the same manner as in Example 1.
$^{(2)}$Measured in the same manner as in Example 1.
$^{(3)}$Calculated in the same manner as in Example 1 (unit: MPa, after 10,000 hours).
*The high-temperature properties were not measured because of dissolution of Si.

COMPARATIVE EXAMPLES 2, 3

A silicon nitride powder (produced by a direct nitriding method, α/(α+β)=92%) having an average diameter of 1.2 μm, a silicon carbide powder having an average diameter of 1.2 μm, and an yttrium oxide powder having an average diameter of 1.4 μm were weighed at proportions shown in Table 3 (total weight: 300 g), mixed for 18 hours by a ball mill with ethanol as a solvent, and then dried. The mixed powder thus obtained was introduced into a graphite die having a diameter of 50 mm as shown in FIG. 1, and sintered by hot pressing under a load of 5 tons at a highest temperature of 1,800° C. in a nitrogen gas for 4 hours. The resultant sintered body was measured with respect to properties in the same manner as in Example 2. The results are shown in Table 3.

TABLE 3

|  | Com. Ex. 2 | Com. Ex. 3 |
|---|---|---|
| Powder Composition (wt. %) |  |  |
| Si$_3$N$_4$ Powder | 92.0 | 64.4 |
| SiC Powder | — | 27.6 |
| Y$_2$O$_3$ Powder | 8.0 | 8.0 |
| Properties of Sintered Body |  |  |
| Density (g/cm$^3$) | 3.2 | 3.0 |
| SiC Content (wt. %)$^{(1)}$ | 0 | 30 |
| Hardness (Hv)$^{(2)}$ | 1,698 | 1,194 |
| Three-point bending strength (MPa) |  |  |
| at Room Temp. | 775 | 408 |
| at 1,400° C. | 139 | 123 |
| Predicted Strength$^{(3)}$ | 49 | 31 |

Note:
$^{(1)-(3)}$Same as under Table 2.

As can be seen from Table 3, the sintered bodies of Comparative Examples 2 and 3 which were not produced by a reactive sintering had no sufficient mechanical strength and heat resistance, because they had no nano-composite structures wherein fine silicon carbide particles existed in silicon nitride particles.

EXAMPLE 4

(1) Production of composite powder

A silicon powder having an average diameter of 0.5 μm, a graphite powder as a carbonaceous material having an average diameter of 5 μm or less, a silicon nitride powder having an average diameter of 0.1 μm, a silicon carbide powder having an average diameter of 0.2 μm, an yttrium oxide powder having an average diameter of 1.4 μm, and an aluminum nitride powder having an average diameter of 2 μm were weighed as shown in Table 4 such that their total weight was 500 g when reacted 100%, mixed for 18 hours by a ball mill with 80 parts by weight of balls and 200 parts by weight of ethanol as a solvent, and then dried.

The mixed powder thus obtained was introduced into a reactor. By heating the mixed powder to 1,380° C. at a temperature elevation speed of 0.5° C./minute (from 1,300° C. to 1,380° C.) and keeping it at 1,380° C. for 60 minutes, it was nitrided and carbonized in a nitrogen gas atmosphere under a pressure of 9 kgf/cm². Thereafter, 100 parts by weight of the mixed powder was introduced into a 2-liter polyethylene pot together with 200 parts by weight of ethanol and 200 parts by weight of silicon nitride balls for ball-milling for 7 days to prepare a composite powder.

The composite powder thus obtained was subjected to an X-ray diffraction measurement to determine crystalline phases of α-silicon nitride and β-silicon nitride, and the percentage of α-silicon nitride in all silicon nitride was determined by the equation:

Percentage (%) of α-Si$_3$N$_4$={total diffraction intensity of (102) and (210) faces (α-Si$_3$N$_4$)/[total diffraction intensity of (102) and (210) faces (α-Si$_3$N$_4$)+total diffraction intensity of (101) and (210) faces (β-Si$_3$N$_4$)]}×100.

The results are shown in Table 7.

TABLE 4

| Powder Composition | Weight (g) | % by Weight |
| --- | --- | --- |
| Si Powder | 270.7 | 69.9 |
| C Powder | 43.7 | 11.3 |
| Si$_3$N$_4$ Powder | 14.9 | 3.9 |
| SiC Powder | 7.7 | 2.0 |
| Y$_2$O$_3$ Powder | 35.0 | 9.0 |
| AlN Powder | 15.0 | 3.9 |

(2) Production of composite sintered body

The composite powder produced in the above step (1) was preliminarily die-pressed at 200 kgf/cm² to a size of 55 mm×35 mm×6 mm and then subjected to CIP at 4 tons/cm². The resultant green body was sintered by HIP at a highest temperature of 1,850° C. under a maximum nitrogen gas pressure of 1,000 kgf/cm² to produce a composite sintered body of silicon nitride and silicon carbide. A microscopic observation indicated that the sintered body had a nano-composite structure.

(3) Properties of composite sintered body

The density of the composite sintered body was measured by an Archimedean method. A test piece of 3 mm×4 mm×40 mm cut from the composite sintered body was subjected to a three-point bending test at a room temperature and 1,400° C. according to JIS R1601 in the same manner as in Example 1. The test piece was also measured with respect to fracture toughness K$_{IC}$ according to a single edge notched beam (SENB) method. The results of the three-point bending test and the fracture toughness test are shown in Table 7.

EXAMPLE 5

The composite powder of silicon nitride and silicon carbide obtained in Example 4 was die-pressed and subjected to CIP under the same conditions as in Example 4. The resulting green body was then subjected to normal-pressure sintering at 1,500° C. in a nitrogen gas atmosphere for 2 hours to produce a composite sintered body. The composite sintered body was measured with respect to mechanical strength and fracture toughness K$_{IC}$ in the same manner as in Example 4. The results are shown in Table 7.

EXAMPLE 6

(1) Production of composite powder

A silicon powder having an average diameter of 0.5 μm, an acetylene black powder having an average diameter of 500 Å, a silicon nitride powder having an average diameter of 0.1 μm, a silicon carbide powder having an average diameter of 0.2 μm, and an yttrium oxide powder having an average diameter of 1.4 μm were weighed at proportions shown in Table 5 such that their total weight was 500 g when reacted 100%, mixed for 18 hours by a ball mill with 80 parts by weight of balls and 200 parts by weight of ethanol as a solvent, and then dried.

TABLE 5

| Powder Composition | Weight (g) | % by Weight |
| --- | --- | --- |
| Si Powder | 274.9 | 72.9 |
| C Powder | 39.4 | 10.4 |
| Si$_3$N$_4$ Powder | 16.1 | 4.3 |
| SiC Powder | 6.9 | 1.8 |
| Y$_2$O$_3$ Powder | 40.0 | 10.6 |

The mixed powder thus obtained was introduced into a reactor and heated to 1,380° C. at a temperature elevation speed of 0.5° C./minute (from 1,300° C. to 1,380° C.). The nitriding and carbonizing treatment was finished without keeping the mixed powder at 1,380° C. in a nitrogen gas atmosphere under a pressure of 9 kgf/cm². 100 parts by weight of the treated mixed powder was introduced into a 2-liter polyethylene pot together with 200 parts by weight of ethanol and 200 parts by weight of silicon nitride balls, and ball-milled for 7 days to provide a composite powder. The percentage of α-silicon nitride in the resultant composite powder was determined in the same manner as in Example 4. The results are shown in Table 7.

(2) Production of composite sintered body

The composite powder produced in the above step (1) was introduced into a hot-pressing graphite die having a diameter of 42 mm, and heated to 1,850° C. under a load of 4.8 tons for hot pressing in a nitrogen gas atmosphere under 9 kgf/cm², thereby producing a composite sintered body of silicon nitride and silicon carbide. A microscopic observation indicated that the sintered body had a nano-composite structure. The composite sintered body was measured with respect to properties in the same manner as in Example 4. The results are shown in Table 7.

EXAMPLE 7

Composite powder and sintered body of silicon nitride and silicon carbide were produced in the same manner as in Example 6 except that a silicon powder having an average diameter of 3.4 μm was used. The percentage of α-silicon nitride in the resultant composite powder was determined, and the properties of the sintered body were measured in the same manner as in Example 4. The results are shown in Table 7.

COMPARATIVE EXAMPLE 4

Using the same mixed powder as in Example 4, a nitriding and carbonization reaction was conducted under the same conditions as in Example 4 except that the temperature elevation speed was changed to 2° C./minute from 1,300° C. After heat treatment, it was ball-milled for 7 days in the same manner as in Example 4.

The resultant composite powder of silicon nitride and silicon carbide was molded and subjected to HIP sintering under the same conditions as in Example 4. The resultant composite sintered body was measured with respect to mechanical strength and fracture toughness $K_{IC}$ in the same manner as in Example 4. The results are shown in Table 7.

COMPARATIVE EXAMPLE 5

Using the same mixed powder as in Example 4 except that an acetylene black powder was used as a carbonaceous powder, a nitriding and carbonization reaction was conducted under the same conditions as in Comparative Example 4. After heat treatment, it was ball-milled for 7 days in the same manner as in Example 4.

The resultant composite powder of silicon nitride and silicon carbide was molded and subjected to HIP sintering under the same conditions as in Example 4. The resultant composite sintered body was measured with respect to mechanical strength and fracture toughness $K_{IC}$ in the same manner as in Example 4. The results are shown in Table 7.

Figure 3:
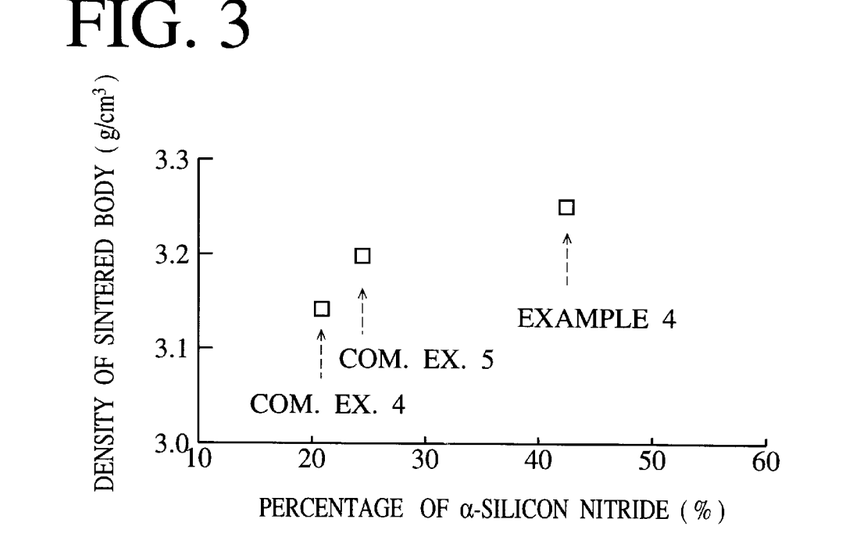
FIG. 3 is a graph showing the relationship between the sintering density and the percentage of α-silicon nitride in composite sintered bodies in Example 4 and Comparative Examples 4 and 5.
Figure 4:
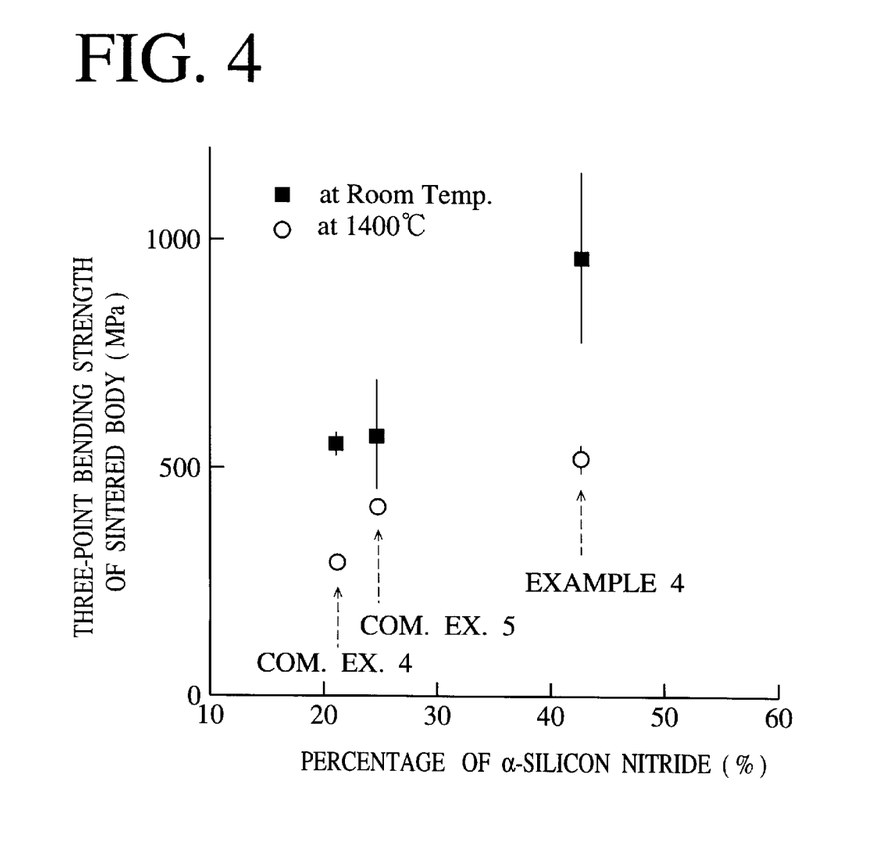
FIG. 4 is a graph showing the relationship between the bending strength and the percentage of α-silicon nitride in the composite sintered bodies in Example 4 and Comparative Examples 4 and 5.

With respect to the composite sintered bodies of Example 4 and Comparative Examples 4 and 5, FIG. 3 shows the relationships between their sintering densities and their percentages of α-silicon nitride, and FIG. 4 shows the relationships between their three-point bending strength and their percentages of α-silicon nitride. It is clear from these data that the composite sintered body of Example 4 has higher density and three-point bending strength than those of Comparative Examples 4 and 5.

COMPARATIVE EXAMPLE 6

The composite powder of silicon nitride and silicon carbide produced in Comparative Example 5 was molded and subjected to CIP under the same conditions as in Example 4. The resulting green body was subjected to normal-pressure sintering under the same conditions as in Example 5. The resultant composite sintered body was measured with respect to mechanical strength and fracture toughness $K_{IC}$ in the same manner as in Example 4. The results are shown in Table 7.

COMPARATIVE EXAMPLE 7

The same powders as in Example 4 without yttrium oxide powder and aluminum nitride powder were weighed at proportions shown in Table 6, and mixed by a ball mill under the same conditions as in Example 4, and then dried.

TABLE 6

| Powder Composition | Weight (g) | % by Weight |
| --- | --- | --- |
| Si Powder | 298.8 | 81.5 |
| C Powder | 42.8 | 11.7 |
| Si$_3$N$_4$ Powder | 17.5 | 4.8 |
| SiC Powder | 7.5 | 2.0 |

The mixed powder thus obtained was introduced into a reactor and then nitrided and carbonized under the same conditions as in Example 4. 90% by weight of the heat-treated composite powder, 7% by weight of an yttrium oxide powder having an average diameter of 1.4 μm and 3% by weight of an aluminum nitride powder having an average diameter of 2 μm were mixed, and 100 parts by weight of the resultant mixture was introduced into a 2-liter polyethylene pot together with 200 parts by weight of ethanol, and 200 parts by weight of silicon nitride balls. The powder mixture was ball-milled for 7 days to produce a composite powder having the same composition as Example 4. The percentage of α-silicon nitride in the composite powder was determined in the same manner as in Example 4. The results are shown in Table 7.

The composite powder of silicon nitride and silicon carbide was molded and subjected to HIP sintering under the same conditions as in Example 4 to produce a composite sintered body of silicon nitride and silicon carbide. The composite sintered body was measured with respect to mechanical strength and fracture toughness $K_{IC}$. The results are shown in Table 7.

TABLE 7

| No. | α-Si$_3$N$_4$$^{(1)}$ | Three-Point Bending Strength (MPa) | | Fracture Toughness (MPa · m$^{1/2}$) | Sintering Density (g/cm$^3$) |
| --- | --- | --- | --- | --- | --- |
| | | at R. T. | at 1,400° C. | | |
| Example | | | | | |
| 4 | 42.5 | 960.5 | 518.5 | 8.05 | 3.25 |
| 5 | 42.5 | 702.9 | 495.4 | —$^{(2)}$ | 3.28 |
| 6 | 32.3 | 1038.2 | 727.3 | —$^{(2)}$ | 3.31 |
| 7 | 42.3 | 1084.2 | 830.3 | —$^{(2)}$ | 3.32 |
| Comparative Example | | | | | |
| 4 | 20.8 | 552.5 | 293.1 | 7.03 | 3.14 |
| 5 | 24.4 | 572.1 | 412.5 | 7.88 | 3.20 |
| 6 | 24.4 | 470.8 | 181.1 | 5.09 | 3.10 |
| 7 | 5.3 | 397.4 | 108.2 | —$^{(2)}$ | 3.28 |

Note:
$^{(1)}$Percentage (%) of α-Si$_3$N$_4$ in composite powder = {total diffraction intensity of (102) and (210) faces (α-Si$_3$N$_4$)/[total deffraction intensity of (102) and (210) faces (α-Si$_3$N$_4$) + total diffraction intensity of (101) and (210) faces (β-Si$_3$N$_4$]} × 100.
$^{(2)}$Not measured.

As is clear from Table 7, the percentage of α-Si$_3$N$_4$ was much smaller in the composite powders of Comparative Examples 4–6 in which the temperature elevation speed was 2° C./minute during the nitriding and carbonization reaction than in the composite powders of Examples 4–7 in which the temperature elevation speed was 0.5° C./minute during the nitriding and carbonization reaction. Also, the percentage of α-Si$_3$N$_4$ was much smaller in Comparative Example 5 in which no sintering aid was used in the process of nitriding and carbonizing than in Example 4.

EXAMPLE 8

78.0% by weight of a silicon powder having an average diameter of 0.7 μm (available from Kinseimatec K.K., JIS No. 1), 11.2% by weight of a carbon powder having a diameter of up to 5 μm (purity: 99.9%, available from Kojundo Kagaku K.K.), 10.8% by weight of an yttrium oxide powder having an average diameter of 1.5 μm (purity: 99.9%, available from Nihon Yttrium K.K.) were weighed and mixed. 100 parts by weight of the mixed powder was introduced into a resin pot together with 100 parts by weight of ethanol and 80 parts by weight of silicon nitride balls, and ball-milled for 18 hours and then dried.

The resultant mixed powder was heat-treated at 1230° C. in a nitrogen gas atmosphere at 9 kgf/cm$^2$ to cause nitriding and carbonizing reactions. Thereafter, 100 parts by weight of the heat-treated mixture was pulverized for 64.5 hours with 100 parts by weight of ethanol and 100 parts by weight of silicon nitride balls and then dried. The resultant powder was classified by a precision air classifier to provide a composite powder having a maximum diameter of 2 μm or less.

EXAMPLES 9–11 AND COMPARATIVE EXAMPLES 8–13

Each of the heat-treated composite powders prepared in the same manner as in Example 8 was pulverized under various conditions of time, ball amount and classification. The properties of these composite powders are shown in Table 8. The specific surface area was 7 $m^2/g$ or more in Examples, while it was less than 7 $m^2/g$ in Comparative Examples. With respect to Example 11 and Comparative Example 9, the results of composition analysis are shown in Table 9.

TABLE 8

| No. | SSA[1] ($m^2/g$) | Diameter (μm)[2] Average | Maximum | Density ($g/cm^3$) |
|---|---|---|---|---|
| Example | | | | |
| 8 | 8.55 | 0.54 | 2.31 | 3.15 |
| 9 | 10.62 | 0.53 | 1.94 | 3.22 |
| 10 | 12.08 | 0.50 | 1.64 | 3.25 |
| 11 | 15.98 | 0.52 | 1.94 | 3.28 |
| Comparative Example | | | | |
| 8 | 3.54 | 2.07 | 13.08 | 2.77 |
| 9 | 5.45 | 0.89 | 11.00 | 2.98 |
| 10 | 6.87 | 0.73 | 7.78 | 3.09 |
| 11 | 4.75 | 0.84 | 5.50 | 2.78 |
| 12 | 5.36 | 0.87 | 6.54 | 2.94 |
| 13 | 6.81 | 0.68 | 5.50 | 3.07 |

Note:
[1]BET specific surface area measured using a nitrogen gas in a gas-absorbing specific surface area/pore distribution measuring apparatus available from Yuasa Ionics K.K.
[2]Particle diameter distribution was measured by a laser diffraction (microtrack) method.

TABLE 9

| No. | Elements (parts by weight) | | | | |
|---|---|---|---|---|---|
| | Si[1] | Y[2] | C[3] | N[4] | O[4] |
| Example 11 | 55.4 | 6.3 | 8.7 | 26.0 | 4.9 |
| Com. Ex. 9 | 56.6 | 6.4 | 8.9 | 25.0 | 4.4 |

Note:
[1]Measured according to JIS R2212 (coagulating gravimetric method).
[2]Pretreated according to JIS R2212 and then measured according to an ICP-AES method.
[3]Measured by a carbon analyzer of LECO.
[4]Measured by an oxygen/nitrogen analyzer of LECO.

Figure 5:
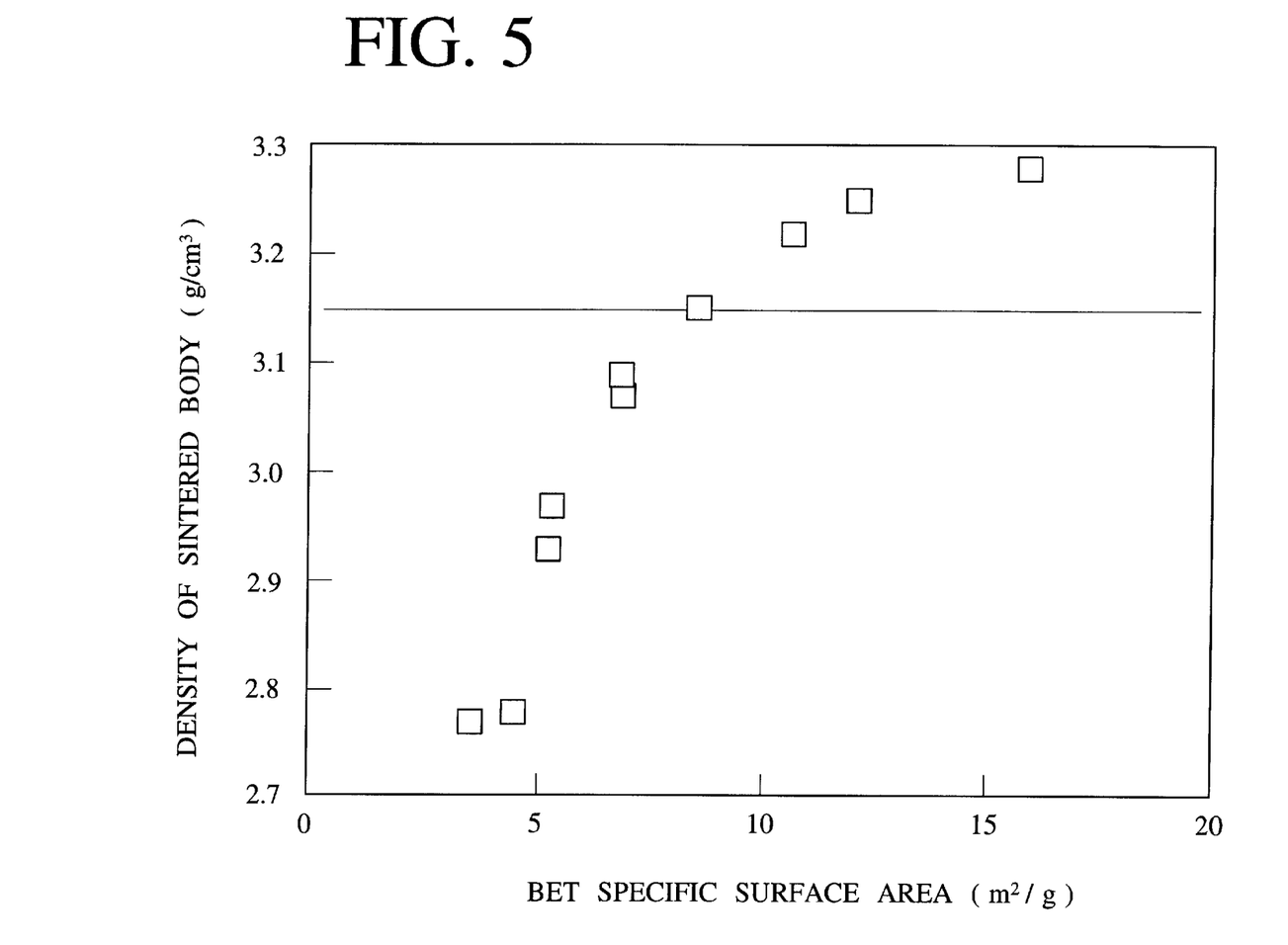
FIG. 5 is a graph showing the relationship between the sintering density and the BET specific surface area in Examples 8–11 and Comparative Examples 8–13.

Each composite powder was preliminarily die-pressed and then subjected to CIP at 4 tons/$cm^2$ to provide a green body of 50 mm×32 mm×7 mm. Each green body was sintered at 2,000° C. for 4 hours in a nitrogen gas at 9 kgf/$cm^2$. The resultant sintered body was measured by an Archimedean method. The results are shown in FIG. 5.

Test pieces having a density of 3.15 g/$cm^3$ or more were subjected to a three-point bending test at a room temperature and 1,400° C. according to JIS R1601. The three-point bending test at 1,400° C. was carried out after heating to 1,400° C. over 2 hours and keeping the test pieces at 1,400° C. for 1 hour. The measured bending strength is shown in Table 10.

TABLE 10

| | Bending Strength (MPa) | |
|---|---|---|
| Example No. | at R. T. | at 1400° C. |
| 8 | 655 | 424 |
| 9 | 898 | 511 |
| 10 | 1118 | 512 |
| 11 | 661 | 571 |

COMPARATIVE EXAMPLE 14

64.4% by weight of a silicon nitride ("SN-E10" available from UBe Industries, Ltd., specific surface area: 10 $m^2/g$) was mixed with 27.6% by weight of a silicon carbide powder ("MSC-20" available from Mitsui Toatsu Chemicals, Inc., specific surface area: 23.2 $m^2/g$) and 8% by weight of an yttrium oxide powder (available from Nihon Yttrium K.K., specific surface area: 2.5 $m^2/g$). 100 parts by weight of the mixed powder was introduced into a resin pot together with 100 parts by weight of ethanol and 80 parts by weight of silicon nitride balls, and ball-milled for 18 hours and then dried. The resultant mixed powder had the same composition as those of the composite powders of Examples 8–11 and Comparative Examples 8–13 and a specific surface area of 13.04 $m^2/g$.

The mixed powder was classified through a thieve of 355 μm, preliminarily die-pressed and then subjected to CIP at 4 tons/$cm^2$ to provide a green body of 50 mm×32 mm×7 mm. Each green body was sintered at 2,000° C. for 4 hours in a nitrogen gas at 9 kgf/$cm^2$. The resultant sintered body had a density of 2.65 g/$cm^3$ according to an Archimedean method. Since this sintered body had a small density, its strength could not be measured.

It is clear that a high-density sintered body cannot be obtained even by molding and sintering a mixed powder having a specific surface area of 7 $m^2/g$ or more, if the mixed powder is prepared simply by mixing a silicon nitride powder and a silicon carbide powder. Instead, by using a composite powder of silicon nitride and silicon carbide having a specific surface area of 7 $m^2/g$ or more prepared by heat-treating a mixture of a silicon powder, a carbonaceous powder and a sintering aid powder in a nitrogen-containing atmosphere to nitride and carbonize silicon in the mixed powder, it is possible to produce a high-density sintered body at an atmospheric pressure of less than 10 kgf/$cm^2$.

As described above, since a mixture of a silicon powder, a carbonaceous powder and a sintering aid powder is used as starting materials, and since silicon is nitrided and carbonized by a heat treatment in a nitrogen-containing atmosphere, the resulting composite powder has a high percentage of α-silicon nitride.

Also, the starting powders used in the present invention are substantially crystalline without containing amorphous powders, the generation of a gas which may occur by the thermal decomposition of the amorphous powders is prevented, thereby providing the resultant sintered body with a high density. Also, since a silicon powder and a carbonaceous powder may not be expensive fine powder produced by CVD, etc., the composite powder of the present invention produced from such materials is inexpensive.

Particularly when the specific surface area of the composite powder is 7 $m^2/g$ or more, the composite powder is excellent in sinterability and thus can be sintered in a nitrogen-containing atmosphere at as low a pressure as less than 10 kgf/$cm^2$.

The composite sintered body having a uniform structure without segregation can be produced from the composite powder of the present invention at a low cost without restriction of thickness. The composite sintered body has a nano-composite structure in which fine silicon carbide particles are uniformly dispersed in silicon nitride particles. Accordingly, the composite sintered bodies of silicon nitride and silicon carbide have excellent mechanical strength, hardness, toughness, static fatigue resistance, wear resistance, etc. Such composite sintered bodies are suitable as structural members, etc. for use at high temperatures.

What is claimed is:

1. A crystalline composite powder having a specific surface area of 7 $m^2$/g or more as measured by a BET method, which comprises silicon nitride, silicon carbide and a sintering aid which is either at least one oxide selected from the group consisting of $Y_2O_3$, $Al_2O_3$, $SiO_2$, MgO, $Yb_2O_3$, $HfO_2$, $La_2O_3$, $Fe_2O_3$, $Lu_2O_3$ and $ZrO_2$ or a combination of at least one of said oxides and AlN, and which contains α-silicon nitride in an amount of 30% or more based on all silicon nitride in said composite powder, said composite powder being produced by heat-treating a powder mixture comprising a silicon powder, a carbonaceous powder and said sintering aid powder in a nitrogen-containing atmosphere to nitride and carbonize silicon in said powder mixture, a content of said silicon powder being 81.2 to 97.6% by weight based on a total weight of said silicon powder and said carbonaceous powder, a content of said carbonaceous powder being 2.4 to 18.8% by weight based on a total weight of said silicon powder and said carbonaceous powder, and a content of said sintering aid powder being 5 to 20% by weight based on a total weight of said composite powder formed by said heat treatment.

2. The composite powder of silicon nitride and silicon carbide according to claim 1, wherein said sintering aid comprises yttrium oxide.

3. A method of manufacturing a composite powder of silicon nitride and silicon carbide, comprising the steps of (a) mixing a silicon powder, a carbonaceous powder and a sintering aid powder, and (b) heat-treating the resultant mixed powder in a nitrogen-containing atmosphere at a temperature of 1,450° C. or lower to thereby nitride and carbonize silicon in said mixed powder, wherein the resultant mixed powder is heated up to said temperature by heating at a temperature elevation speed of less than 2° C./minute at least in a range from a temperature at which nitriding and carbonizing of silicon starts to take place to said temperature of 1450° C. or lower at which said mixed powder is heat-treated.

4. The method of manufacturing a composite powder of silicon nitride and silicon carbide according to claim 3, wherein said mixture is heat-treated at a temperature ranging from 1,100° C. to 1,400° C.

5. The method of manufacturing a composite powder of silicon nitride according to claim 3, wherein said composite has a content of α-silicon nitride which is at least 30% based on all silicon nitride in said composite powder.

6. A method of manufacturing a composite sintered body of silicon nitride and silicon carbide from the composite powder recited in claim 1, comprising the steps of (a) forming a green body from said composite powder, (b) sintering said green body at a temperature of 1,600° C. to 2,200° C. in a nitrogen-containing atmosphere.

7. The method of manufacturing a composite sintered body of silicon nitride and silicon carbide according to claim 6, wherein the sintering occurs at a pressure of less than 10 kgf/$cm^2$.

8. A method of manufacturing a composite sintered body of silicon nitride and silicon carbide comprising the steps of (a) mixing a silicon powder, a carbonaceous powder and a sintering aid powder, (b) heat-treating the resultant mixed powder at a temperature of 1,450° C. or lower in a nitrogen-containing atmosphere to thereby nitride and carbonize silicon in said mixed powder to produce a composite powder, wherein the resultant mixed powder is heated up to said temperature by heating at a temperature elevation speed of less than 2° C./minute at least in a range from a temperature at which nitriding and carbonizing of silicon starts to take place to said temperature of 1450° C. or lower at which said mixed powder is heat-treated, (c) molding said composite powder, and (d) sintering the resultant green body in a nitrogen-containing atmosphere.

9. The method of manufacturing a composite sintered body of silicon nitride and silicon carbide according to claim 8, wherein the sintering of said green body is carried out by hot isostatic pressing or hot pressing.

10. The method of manufacturing a composite sintered body of silicon nitride and silicon carbide according to claim 8, wherein the sintering occurs at a temperature of from 1,600° C. to 2,200° C.

* * * * *